Oct. 5, 1965  E. K. KARLSSON  3,209,525
REACTION DRIVE ARRANGEMENT FOR A RECIPROCATING MOWER
Filed Jan. 4, 1962
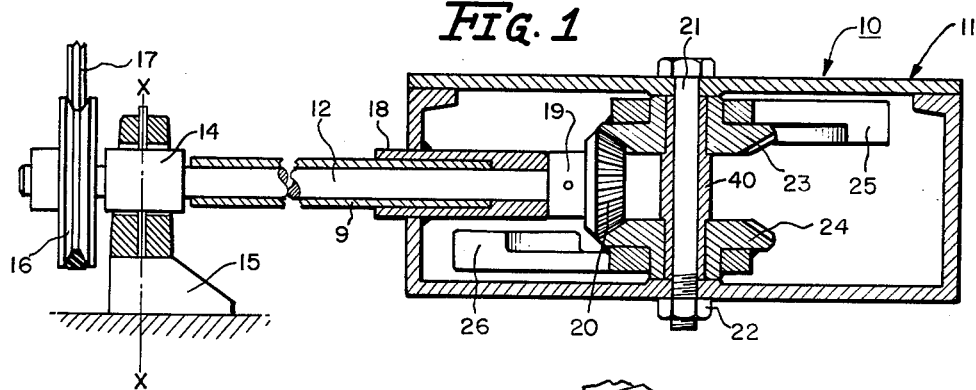
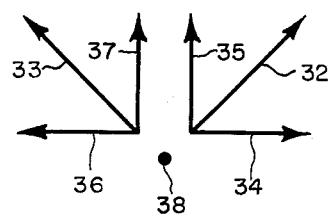
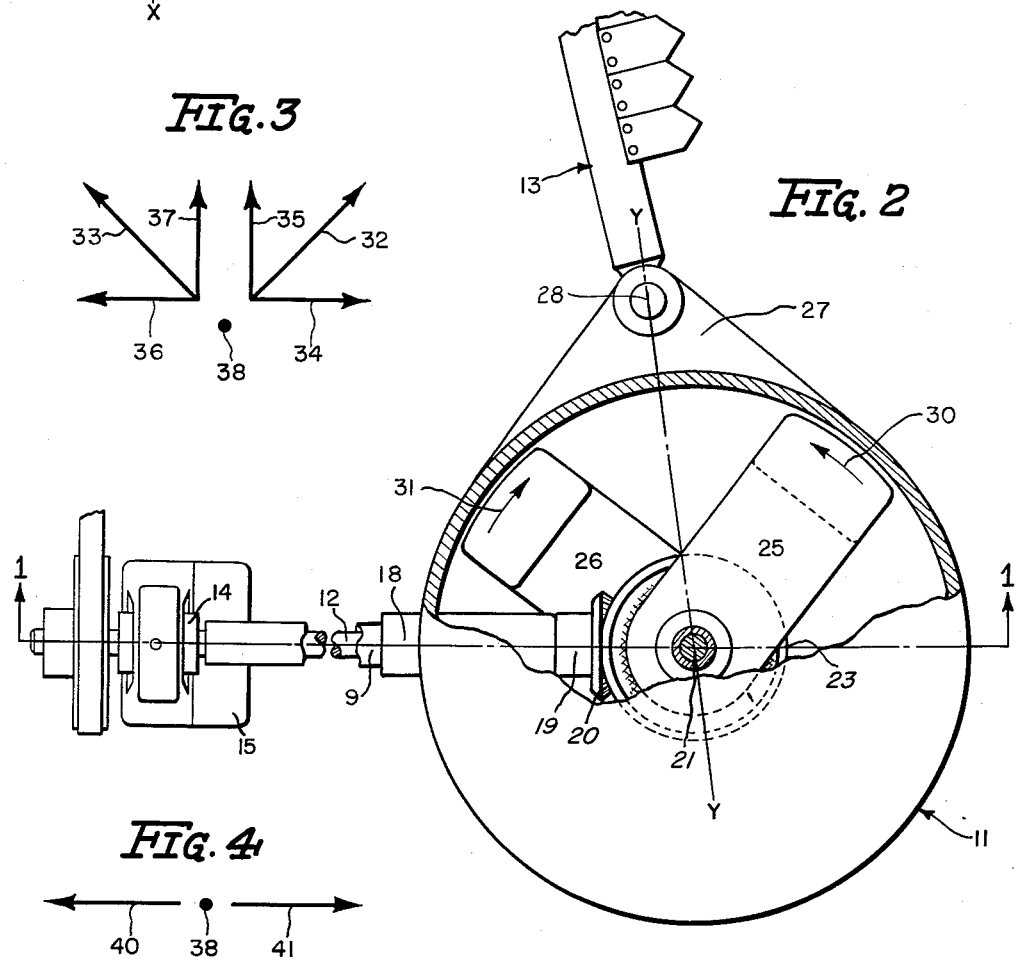
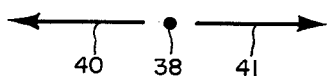
INVENTOR.
Elof K. Karlsson
Paul O. Pippel
ATTORNEY

United States Patent Office 3,209,525
Patented Oct. 5, 1965

3,209,525
REACTION DRIVE ARRANGEMENT FOR A
RECIPROCATING MOWER
Elof K. Karlsson, East Moline, Ill., assignor to International Harvester Company, Chicago, Ill., a corporation of New Jersey
Filed Jan. 4, 1962, Ser. No. 164,358
1 Claim. (Cl. 56—296)

This invention is directed to a reaction drive arrangement for translating energy between driving and driven elements, and more particularly to such an arrangement in which the coupling between the driving and driven elements is such as to avoid damaging the driving arrangement when the driven element is stopped otherwise than by deenergization of the equipment.

The invention will be described in connection with an arrangement for translating unidirectional drive energy into longitudinal reciprocating motion which may be utilized, by way of example, in reciprocating a cutting knife or sickle with respect to the guard assembly of a mower unit such as is frequently utilized in agricultural implements. Reference may be had to the patent to John R. Orelind, No. 2,824,416, for a disclosure of a conventional mower. Such a mower arrangement might be utilized in a tractor-mounted implement, or as a component in a harvester-thresher unit for processing crop material in a well-known manner. Reference may be had to the patent to Peter B. Andersen, No. 3,073,099, for a disclosure of a conventional harvester thresher having a mower mounted thereon. Inasmuch as the various constructions of elements in the prior arrangements for providing unidirectional movement such as rotary motion at various points, together with the construction and operation of the cutting units themselves, are now well-known and understood, this disclosure will not advert to such elements and units but will focus upon the invention which includes an unobvious reaction drive arrangement suitable for use between the drive element and the cutting unit.

Various operating deficiencies have been noted in prior art mowing arrangements. For example, the means utilized to convert unidirectional or rotary drive motion into a longitudinal reciprocating motion has frequently transferred a significant portion of the oscillating forces to the sickle drive head and/or to the sickle bar, resulting in a corresponding undesired vibration of the pitman pivot unit and, where the mower is at the front of a combine or similar arrangement, of the platform. In addition, to effect necessary drive of the sickle bar a direct coupling has been utilized between the driving element, displaced in rotary movement, and the driven element, ultimately displaced in a longitudinal reciprocating movement. "Direct coupling," as used herein and in the appended claims to denote means for translating power from a driving element to a driven element, describes not only a direct physical connection between the driving and driven elements, but also any concatenation of units therebetween so disposed that when the driven element is halted, the driving element is likewise stopped in its motion notwithstanding the continued application of driving power to the driving element. With such an arrangement, if a stone or other unyieldable object enters between the sickle blade and the guard assembly, the sickle is immediately halted in its movement and, because of the continued application of the driving power to the rotary driving element, there is manifestly danger of severe damage to the system.

It is therefore a primary object of the present invention to provide a novel and unobvious reaction drive arrangement which minimizes the vibration of the supporting units in the translation of an oscillating or unbalanced force to a driven element.

A salient object of the invention is the provision of a novel sickle drive including a reaction drive arrangement to insure that when an unyieldable object enters or is placed between the guard points, the driven sickle bar stops without breakage or damage to any part of the system.

A corollary object of the invention is the provision of such an arrangement for a cutting unit which, after an automatic stoppage to obviate damage to the equipment, will again commence operation after the object is removed or the trouble cleared without any resetting or other adjustment of the machinery.

The foregoing and other objects are realized, in a preferred embodiment of the invention, by providing a conversion unit for developing unbalanced forces generally along a reference axis in response to unidirectional displacement of a driving element, which unidirectional displacement may be an angular displacement in a given direction. Such displacement effects a related movement of different masses along different predetermined paths so that along an axis substantially perpendicular to the reference axis the forces developed by the moving masses effectively cancel each other, but along the reference axis the forces so developed are additive. As such forces are translated to an intermediate element, such as the housing of the conversion unit, a linear reciprocation of the housing is effected. By affixing a driven element, such as the sickle or cutter bar, to the housing, the linear reciprocation of the housing is transmitted to the sickle to provide the desired motion thereof without a direct intercoupling of the input driving shaft with the output driven element, the sickle bar. In such a system, when an unyieldable object is inserted between the guard points, the oscillation of the housing is damped, and the drive energy can be continuously applied to the input element of the conversion unit without any damage to any portion of the system. As soon as the unyieldable object is removed, the continuously developed unbalancing forces are again effective to displace the housing through the desired amplitude and effect a concomitant and related displacement of the cutter bar.

The best mode contemplated for carrying out the invention will now be described. To enable those skilled in the art to make and to use the inventon, such description is set forth in connection with the accompanying drawing, in the several figures of which like reference numerals identify like elements, and in which:

FIGURE 1 is a side view, partly in section and partly broken away, illustrating a preferred embodiment of the invention;

FIGURE 2 is a top view, partly broken away, depicting various of the components shown in FIGURE 1 and showing the driven element; and FIGURES 3 and 4 are illustrative diagrams useful in understanding the operation of the invention.

Structure of the invention

As shown in related FIGURES 1 and 2, the invention includes a conversion unit 10 having a housing 11 which may be comprised of a plurality of metal plates welded together or otherwise joined in the configuration illustrated. Briefly, conversion unit 10 converts the rotary drive energy of a driving element, which in the preferred embodiment illustrated is a shaft 12, into longitudinal reciprocating motion of a driven element, depicted as a sickle or cutter bar 13 coupled by bolt 28 to housing 11. The cutter bar 13 is reciprocated generally about a reference axis designated Y—Y in FIGURE 2. For a detailed description of the cutting action of a cutter bar such as herein designated 13, reference is made to the above-referred-to U.S. Patent No. 2,824,416. In more detail, shaft 12 is supported near one end thereof in a bearing unit 14, itself pivotally supported on or affixed to a suitable support means about a pivot axis designated X—X in FIGURE 1, such as a support bracket 15. Bracket 15 can, of course, be affixed to a platform coupled to a tractor, or it can be welded or otherwise affixed to the platform at the front end of a combine, depending upon the environment in which the present invention is to be used. Adjacent bearing unit 14 a V-pulley drive sheave 16 is affixed to shaft 12, to receive input rotational drive energy from an element such as a belt 17.

A sleeve 9 encloses shaft 12 from a point adjacent bearing unit 14 to a location near the other end of shaft 12 at which a cylindrical bearing unit 18, affixed in housing 11 as indicated, supports the other end of shaft 12. As will become clear from the subsequent explanation, such mounting is utilized to afford a pivotal displacement of the system about the center of bearing unit 14 as a pivot point, as the entire unit within housing 11 is oscillated back and forth to effect a corresponding oscillation of the housing itself. A bevel gear 20, which can be considered as the input means for the conversion unit 10, is coupled over a collar 19 to shaft 12 to receive rotary drive therefrom.

The shank of a pivot element, shown as a bolt 21, passes through the center of housing 11, being affixed on one side by a nut 22. A pair of bevel gears 23 and 24 are carried in spaced-apart relationship on a tubular bushing 40 which in turn is carried by a pivot element 21, each of gears 23 and 24 being in meshing engagement with bevel gear 20. A first mass, shown as an upper weight 25, is affixed to bevel gear 23 and pivoted around bolt 21 for concomitant rotation with bevel gear 23, and a second mass, depicted as lower weight 26, is disposed beneath lower bevel gear 24 and is affixed to gear 24 for simultaneous rotation therewith about pivot element 21. The pivot element 21 provides a pivot axis serving as an effective reference point about which the unbalancing forces provided by weights 25 and 26 are summed algebraically. That is, element 21 is in effect a summation means for geometrically summing the different forces developed by masses 25 and 26. A flange or ear or reaction means 27 is affixed to housing 11 and effectively comprises a portion thereof. Flange or reaction means 27 is apertured to provide a mounting hole through which coupling means, such as a bolt 28, is passed to couple sickle bar 13 to the housing 11.

*Operation of the invention*

To effect angular displacement of shaft 12, any of a multiplicity of sources can be utilized to drive V-belt 17 and effect a corresponding rotation of drive sheave 16, thereby effecting simultaneous rotation of shaft 12. As shaft 12 is rotated, bevel gear 20 likewise rotates and effects simultaneous rotation of each of bevel gears 23 and 24 in opposite directions, causing a concomitant angular displacement of masses or weights 25 and 26 affixed thereto. Each time the weights 25 and 26 are aligned in a vertical plane, the centrifugal forces thereof are additive.

For example, as the masses 25 and 26 continue to rotate in the directions indicated by the arrows 30 and 31, after each mass has been displaced through approximately 45° from the positions shown in FIGURE 2, they will be aligned vertically. In the positions illustrated in FIGURE 2, the masses develop centrifugal forces which are represented by vectors 32 and 33 in FIGURE 3. Vector 32 represents the centrifugal force of mass 25 developed with respect to a reference point 38 coincident with the axis of summation means 21, and this force is separable into a horizontal component 34 and a vertical component 35. In like manner, the centrifugal force 33 of mass 26 is separable into a horizontal component 36 and a vertical component 37. The horizontal components 34 and 36, of the respective centrifugal force vectors are equal and opposite, thus effectively canceling each other, whereas the vertical components 35 and 37 are additive and tend to effect a rectilinear reciprocating displacement of conversion unit 10, and, through housing 11, to effect a corresponding displacement of sickle bar 13. The amplitudes of the horizontal components 34 and 36 continue to diminish until the masses 25 and 26 are aligned vertically as previously described. As the masses 25 and 26 reach positions displaced approximately 135° from their respective positions shown in FIGURE 2, the centrifugal forces represented by vectors 40 and 41 in FIGURE 4 are developed. That is, the centrifugal force of mass 25 is represented by vector 40, and the centrifugal force developed by mass 26 is illustrated by vector 41. As there shown, there is no vertical component of these respective vector forces, and thus the equal and opposite horizontal amplitudes of the vectors effectively cancel each other to minimize displacement of the housing along the axial direction of shaft 12. Accordingly the principal movement (other than its rotation) of shaft 12 is a pivoting movement about axis X—X with bearing unit 14 acting as a pivot support.

The displacement of housing 11, as shaft 12 is rotated to produce the unbalancing motion of masses 25 and 26, is related to the displacement of a pendulum about its pivot point. A portion of shaft 12 within bearing unit 14 can be considered as the pivot point, with housing 11 describing a pendular or pendulating motion about such point. The unbalancing masses 25 and 26 are displaced in respective planes, each of such planes being substantially parallel to the plane of pendulation. The motion of cutter bar 13 is also substantially in the plane of pendulation, and along a reference axis designated Y—Y substantially perpendicular to the longitudinal axis of shaft 12.

Those skilled in the art will recognize that the stroke of sickle bar 13 is determined in part by the weight, and in part by the angular velocity, of masses 25 and 26; both of these factors can be considered as constant for practical purposes. In addition, the stroke is in part determined by the cutting load. Therefore, when the equipment is idling, the stroke must be greater than the extent of the stroke under operating conditions so that the shearing load of the crop material matches the accelerating forces of masses 25 tnd 26.

The unobvious structure of the invention has the decided advantage that, when an unyielding object is positioned between the points of a guard assembly to forcibly halt the motion of cutter bar 13, this only acts as a damping restraint upon the reciprocation of housing 11. This is possible because there is no direct coupling between driving element 12 and driven element 13. Instead, conversion unit 10 effectively translates the rotary motion into a linear reciprocation of the cutter bar without the direct coupling requisite in prior art devices. Accordingly when the motion of the sickle is forcibly halted the driving energy is continually supplied over belt 17 to effect the rotation of shaft 12 without any damage to the equipment. After the impediment to movement of the cutter bar is removed the continued development of the unbalanced forces, that is the additive components of the centrifugal forces of masses 25 and 26, along a reference axis substantially normal to the axis of shaft 12, is effective to cause linear reciprocating movement of housing 11 which in turn effects a corresponding displacement of cutter bar 13.

Although only a particular embodiment of the invention has been described and illustrated, it is apparent that modifications and alterations may be made therein. It is therefore the intention in the appended claim to cover all such modifications and alterations as may fall within the true spirit and scope of the invention.

What is claimed is:

A reaction drive arrangement for translating rotary movement of a driving element into longitudinal reciprocating movement of a sickle bar without directly intercoupling said elements, comprising:

a conversion unit, including a housing means, a first bevel gear, a pivot element mounted in said housing means, a second bevel gear mounted for rotation about said pivot element and positioned in meshing engagement with said first bevel gear, a first weight affixed to said second bevel gear for rotation in a given direction and in a first plane responsive to rotation of said second bevel gear, a third bevel gear mounted for rotation about said pivot element and positioned in meshing engagement with said first bevel gear, a second weight affixed to said third bevel gear for rotation in a direction opposite said given direction of rotation and in a second plane spaced from and parallel to said first plane, said weights in their rotation developing a combined unbalancing force which reaches a maximum value along a reference axis and exhibits a minimum value along a different axis substantially normal to said reference axis, and said housing means adapted to be displaced in a longitudinal reciprocating movement along said reference axis in response to the development of said unbalancing force;

means, including said driving element, for effecting angular displacement of said first bevel gear and thereby effecting rotation of said first and second weights;

said last mentioned means including a shaft having first and second ends, a bearing unit journalling said shaft for rotation about its longitudinal axis and for oscillation about an axis normal to its longitudinal axis, said bearing unit being positioned with respect to said shaft such that a first lever arm intermediate said first end of the shaft and said bearing unit is formed and a second lever arm, longer than said first lever arm, intermediate said second end of the shaft and said bearing unit is formed;

said second end of the shaft being rigidly connected to said first bevel gear and said first end of the shaft being rigidly secured to said driving element;

and means for coupling said sickle bar to said housing means, said sickle bar being aligned substantially along said reference axis to effect a longitudinal reciprocating movement of said sickle bar related to the longitudinal reciprocating movement of said housing.

References Cited by the Examiner

UNITED STATES PATENTS

| | | | |
|---|---|---|---|
| 1,779,923 | 10/30 | Wagner | 74—61 |
| 2,428,924 | 10/47 | Albertson | 56—296 X |
| 2,545,245 | 3/51 | Stutz | 74—61 X |
| 2,627,849 | 2/53 | Carlson | 74—61 |
| 2,840,354 | 6/58 | McKellar | 74—61 X |

FOREIGN PATENTS 85,721    8/20    Switzerland.

ANTONIO F. GUIDA, *Acting Primary Examiner.*

CARL W. ROBINSON, RUSSELL R. KINSEY,
T. GRAHAM CRAVER, *Examiners.*